United States Patent [19]
Yamada et al.

[11] Patent Number: 5,402,368
[45] Date of Patent: Mar. 28, 1995

[54] COMPUTING UNIT AND DIGITAL SIGNAL PROCESSOR USING THE SAME

[75] Inventors: Kenzi Yamada; Matsuju Yoshida; Hiroko Murakami; Takaaki Ido, all of Kasugai, Japan

[73] Assignees: Fujitsu Limited, Kanagawa; Fujitsu VLSI Limited, Aichi, both of Japan

[21] Appl. No.: 163,726

[22] Filed: Dec. 9, 1993

[30] Foreign Application Priority Data

Dec. 10, 1992 [JP] Japan .................................. 4-330699

[51] Int. Cl.6 .............................................. G06F 7/38
[52] U.S. Cl. .................................................. 364/736
[58] Field of Search .................. 364/736.5, 736, 745, 364/748, 768

[56] References Cited

U.S. PATENT DOCUMENTS

| | | | |
|---|---|---|---|
| 4,811,268 | 3/1989 | Nishitani et al. | 364/736 X |
| 4,852,040 | 7/1989 | Oota | 364/736 X |
| 4,945,506 | 7/1990 | Baji et al. | 364/736 |
| 4,945,507 | 7/1990 | Ishida et al. | 364/736.5 |

Primary Examiner—Tan V. Mai
Attorney, Agent, or Firm—Armstrong, Westerman, Hattori, McLeland & Naughton

[57] ABSTRACT

A first selector outputs either an output of an ALU (arithmetic logic unit) or a first clipped value to a first bus. A temporary register holds the output signal of the ALU, and a second selector outputs either the output signal of the temporary register or a second clipped value. A controller causes an operation result regarding lower data of first and second operands to be stored in the temporary register in a first cycle of the ALU when each of the first and second operands consists of 2n bits while the ALU operates on n bits per cycle thereof. When an operation result regarding upper data of the first and second operands overflows in a second cycle of the ALU, the controller causes the first and second selectors to output the first and second clipped values. When the operation result regarding the upper data does not overflow, the controller causes the first and second selector to respectively output the output signals of the ALU and the temporary register.

6 Claims, 10 Drawing Sheets

FIG.2(a) CLK

FIG.2(b) BUS 104

FIG.2(c) BUS 105

FIG.2(d) ALU OUTPUT DATA

FIG.2(e) OV OR S

FIG.2(f) CLPE

FIG.2(g) CLPD

FIG.2(h) BUS 106

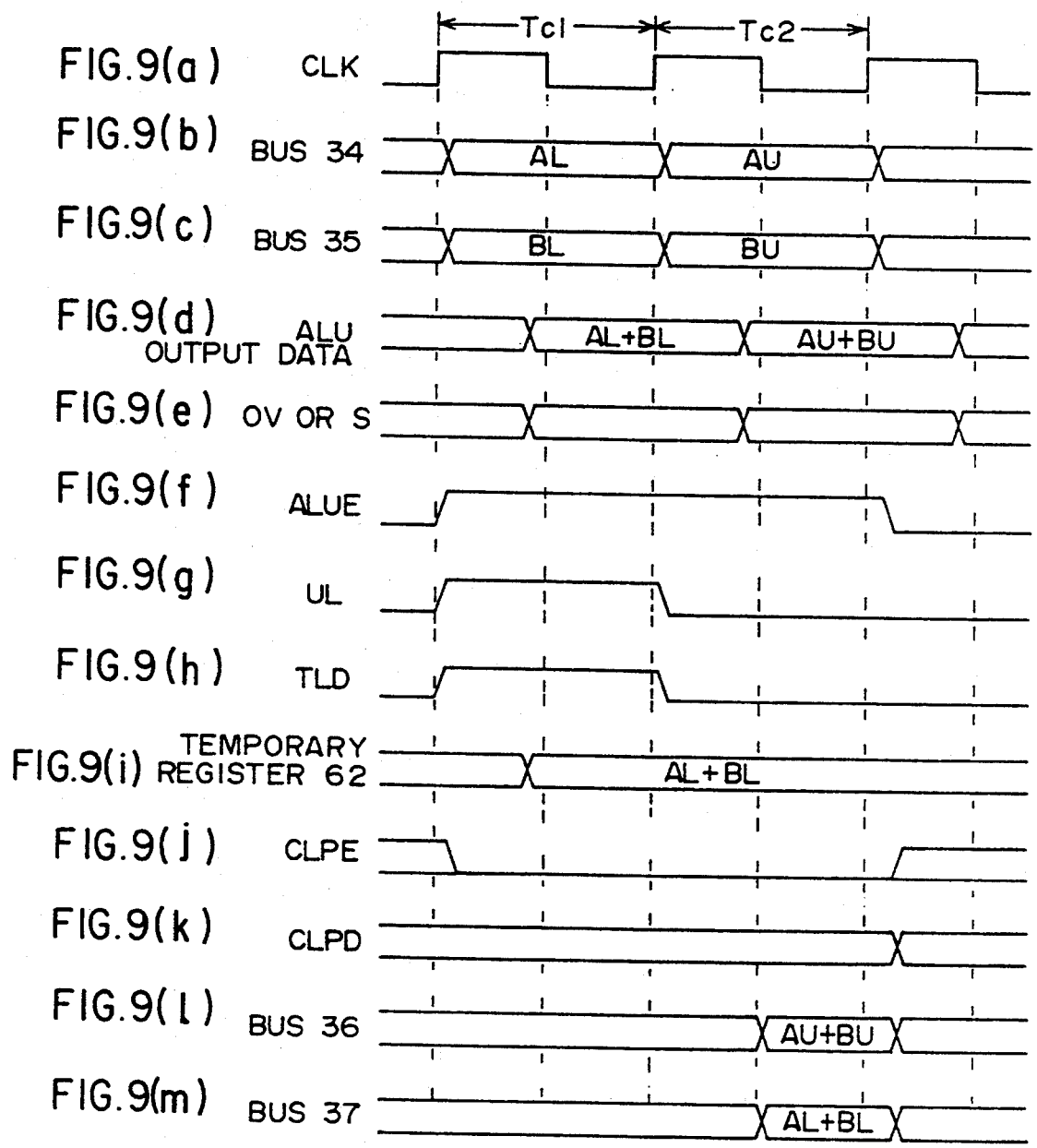

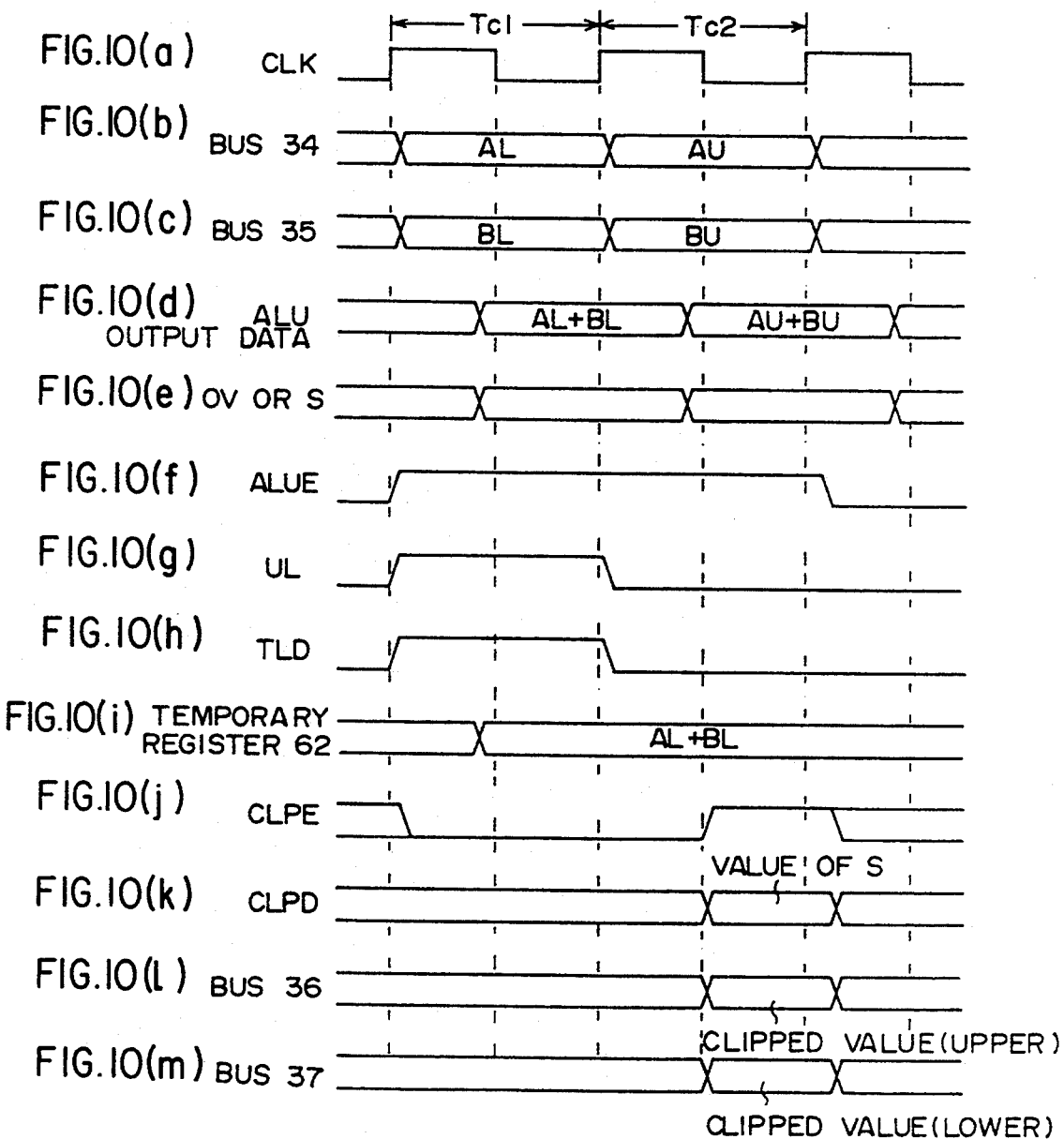

COMPUTING UNIT AND DIGITAL SIGNAL PROCESSOR USING THE SAME

BACKGROUND OF THE INVENTION

FIELD OF THE INVENTION

The present invention generally relates to computing units, and more particularly to a computing unit provided in, for example, a digital signal processor (DSP).

Recently, the advance of the semiconductor technology has drastically increased the integration density of semiconductor elements, and facilitated down-sizing of DSPs. This has resulted in reduction in the cost of DSPs.

With the cost reduction of DSPs, the field to which the DSPs can be applied drastically expands. In the past, the DSPs have been mainly applied to communications devices, such as a modem (modulator-demodulator), and an echo canceller. Recently, the DSPs have been applied to servo control for positioning a read head on a hard disk or an optical disk, and control systems such as engine control and suspension control of automobiles.

Most DSPs used in communications systems are used to perform a high-precision filtering operation. For example, the DSP performs a sum-of-products operation in which an adding value of 32 bits is added to a product having a multiplicand of 16 bits and a multiplier of 16 bits.

However, in the applications to the control systems, the DSPs are used to perform not only the high-precision filtering operation but also a low-precision operation. A low-precision operation is, for example, an operation in which the result of the operation consists of 16 bits. Such a low-precision operation is applied to control for peripheral circuits, such as a timer, an analog-to-digital (A/D) converter and a serial interface.

The hardware structure of the existing DSPs is equipped with a high-precision arithmetic and logic unit for the purpose of speedup of the filtering operation. The aforementioned filtering operation (the sum-of-products operation) is carried out during one machine cycle of the DSPs equipped with the high-precision arithmetic and logic unit. Generally, the high-precision arithmetic and logic unit needs a large quantity of hardware, and does not perform the operation at high speed. Hence, it takes a long time to output the operation result. With the above in mind, normally, the machine cycle is selected so that it is slightly greater than the operation speed of the arithmetic and logic unit. The above machine cycle is the limit regarding the processing speed of the DSPs. Further, the large quantity of hardware of the arithmetic and logic unit degrades the yield rate of DSPs, and causes the DSPs to be expensive.

The existing DSPs perform a low-precision operation within one machine cycle. In practice, the low-precision operation is completed within the first half of the machine cycle, and no operation is carried out during the second half of the machine cycle. Hence, the case where the existing DSPs perform both the high-precision operation and the low-precision operation do not fully utilize the high-speed operation capability of the DSPs.

The performance of the DSPs will be improved in the future, and the ratio of the number of non-high-precision operations to high-precision operations for the peripheral circuit control will be increased in the applications of the DSPs to the control systems. Under the above circumstances, it will be considered desirable that DSPs applied to the control systems be equipped with an arithmetic and logic unit which has a small quantity of hardware and a high-speed operation capability.

In the case where an operation is carried out with a precision twice as high as that of the existing DSPs by means of a DSP equipped with the above-mentioned low-precision arithmetic and logic unit, a clip step will be needed in order to clip the operation result to a maximum or minimum value if the operation result overflows. In order to improve the operation speed of the low-precision arithmetic and logic unit, it is necessary to reduce the time necessary for the clipping process.

SUMMARY OF THE INVENTION

It is an object of the present invention to provide a less expensive computing unit with a reduced quantity of hardware and an improved operation speed.

The above object of the present invention is achieved by a computing unit comprising: register means for storing first and second operands and results of operations; first and second buses for transferring the first and second operands output from the register means; an ALU for performing an operation on the first and second operands and for outputting a result of the operation; a temporary register for temporarily storing the result of the operation output by the ALU; first selector means for selecting either the result of the operation output by the ALU or a first clipped value; second selector means for selecting either an output signal of the temporary register or a second clipped value; third and fourth buses for transferring output signals of the first and second selector means to the register means; and control means for determining whether or not the result of the operation output by the ALU overflows and for controlling the first and second selector means on the basis of whether or not the result of the operation output by the ALU overflows.

Another object of the present invention is to provide a digital signal processor having the above computing device.

This object of the present invention is achieved by a digital signal processor comprising: a computing unit; and an interface unit for establishing an interface between the computing unit and an external device, wherein the computing unit is configured as mentioned above.

BRIEF DESCRIPTION OF THE DRAWINGS

Other objects, features and advantages of the present invention will become more apparent from the following detailed description when read in conjunction with the accompanying drawings, in which:

FIG. 9 is a time chart of the operation of the embodiment of the present invention; and FIG. 10 is a time chart of the operation of the embodiment of the present invention performed when an overflow occurs.

DESCRIPTION OF THE PREFERRED EMBODIMENTS

In order to facilitate understanding of the present invention, a description will be given of a computing unit related to the present invention.

Figure 1:
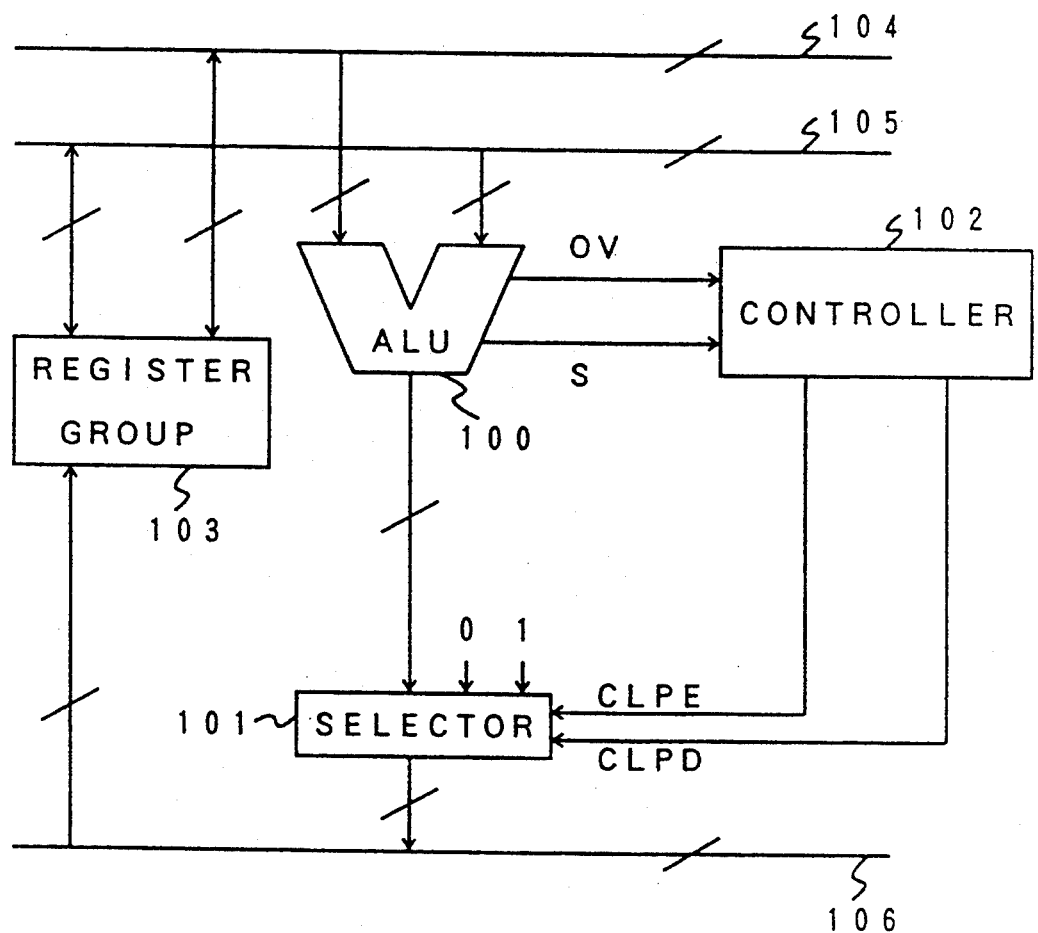
FIG. 1 is a block diagram of a computing unit related to the present invention.

FIG. 1 is a block diagram of such a related computing unit provided in a DSP. The computing unit shown in FIG. 1 is made up of an arithmetic and logic unit (ALU) 100, a selector 101, a controller 102, a group of registers 103 and buses 104 through 106.

The arithmetic and logic unit 100 receives a first operand of n bits (n is a natural number) via the bus 104, and a second operand of n bits via the bus 105. The ALU 100 performs an adding operation on the first and second operands, and outputs the operation result to the selector 101. The most significant bit of the operation result from the ALU 101 is a sign signal S indicating the sign. The ALU 100 outputs the sign signal S to the controller 102. If the sign signal S indicates "0", the sign is plus. If the sign signal S indicates "1", the sign is minus. When the operation result of the ALU 100 overflows, the ALU 100 outputs an overflow signal OV indicative of a logical value "1" to the controller 102.

The controller 102 outputs, on the basis of the sign signal S and the overflow signal OV, a clip enable signal CLPE and a clip data signal CLPD used to control the selector 101. That is, when the sign signal S indicates "0" and the overflow signal OV indicates "1", the controller 102 outputs the clip enable signal CLPE indicative of logical value "1" to the selector 101, and outputs the clip data signal CLPD indicative of logical value "0" to the selector 101. When the sign signal S indicates "1" and the overflow signal OV indicates "1", the controller 102 outputs the clip enable signal CLPE indicative of logical value "1" to the selector 101, and outputs the clip data signal CLPD indicative of logical value "1" to the selector 101. When the sign signal S indicates "0" or "1" and the overflow signal OV indicates "0", the controller 102 outputs the clip enable signal CLPE indicative of "0" to the selector 101.

The selector 101 receives the operation result from the ALU 100, the clip enable signal CLPE and the clip data signal CLPD. When the clip enable signal CLPE indicates "1" and the clip data signal CLPD indicates "0", the selector 101 outputs the maximum value (in which the most significant bit is "0", and the other bits are all "1") to the bus 106. When the clip enable signal CLPE indicates "1" and the clip data signal CLPD indicates "1", the selector 101 outputs the least significant bit (in which the most significant bit is "1" and the other bits are all "0") to the bus 106. When the clip enable signal CLPE indicates "0", the selector 101 outputs the operation result from the ALU 100 to the bus 106 without any modification.

The group 103 of registers is connected to the buses 104 through 106, and is supplied with the first and second operands also supplied to the ALU 100. Further, the output signal from the selector 101 is stored in the register group 103 as the operation result.

Figure 2:
FIG. 2 is a time chart of the operation of the computing unit shown in FIG. 1.
Figure 2:
Figure 2:
Figure 2:
Figure 2:
Figure 2:
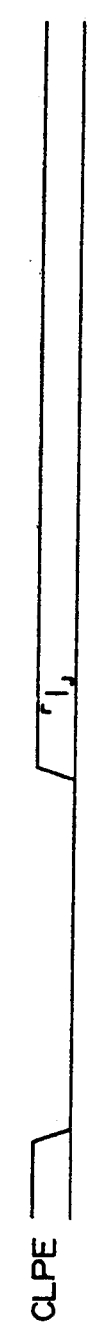
Figure 2:
Figure 2:
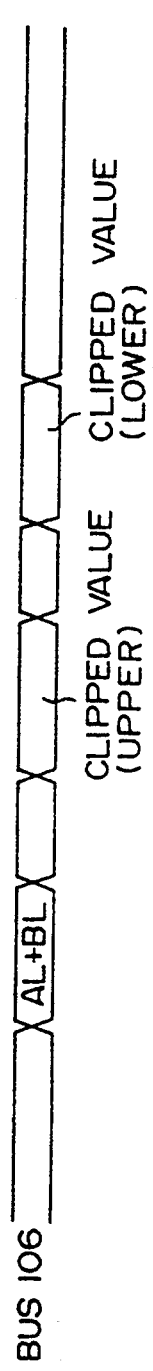

FIG. 2 shows an operation with a precision twice as high as the precision of the ALU 100, that is, an operation on a first operand of 2n bits and a second operand of 2n bits.

First, in the first cycle Tc1, lower (low-order) data AL of the first operand A and lower data BL of the second operand B are transferred to the ALU 100 via the buses 104 and 105, respectively. The ALU 100 adds the lower data AL and BL together, and continues to output the operation result (AL+BL) to the selector 101 during a period equal to the sum of the second half of the first cycle T1 and the first half of the second cycle Tc2.

In the first cycle Tc1, it is unknown whether or not the operation with twice the precision overflows. Hence, the clip enable signal CLPE output by the controller 102 is set to logical value "0". Hence, the above result (AL+BL) of the operation on the lower data is continuously output to the data bus 106 during the second half of the cycle Tc1. The operation result (AL+BL) is stored in the register group 103 via the data bus 106.

In the second cycle Tc2, upper (high-order) data AU of the first operand A and upper data BU of the second operand A are transferred to the ALU 100 via the buses 104 and 105, respectively. The ALU 100 adds the upper data AU and BU together, and continues to output the operation result (AU+BU) to the selector 101 during a period equal to the sum of the second half of the second cycle Tc2 and the first half of the third cycle Tc3.

If the operation result of the ALU 100 does not overflow in the second cycle Tc2, the overflow signal OV indicates "0", and the clip enable signal CLPE from the controller 102 indicates logical value "0". Hence, the result (AU+BU) of the operation on the upper data is continuously output to the data bus during the second half of the second cycle Tc2. The above operation result is stored in the register group 103 via the data bus 106.

In the case where the operation on the first operand A and the second operand B is carried out with the precision twice as high as that of the ALU 100, the result of the above operation is continuously output to the bus 106 during two machine cycles after the first operand A and the second operand B are output to the buses 104 and 105, respectively, if the operation result does not overflow. In the above manner, two machine cycles are needed to carry out the operation with the precision twice as high as that of the ALU 100.

It will now be assumed that the result (AU+BU) of the operation on the upper data AU and the upper data BU overflows in the second cycle Tc2 in the case where the operation on the first operand A and the second operand B is carried out with the precision twice as high as that of the ALU 100. In this case, the overflow signal OV output by the ALU 100 indicates "1", and hence the clip enable signal CLPE output by the controller 102 indicates "1". Hence, the result (AU+BU) of the operation on the upper data AU and BU is clipped, by means of the selector 101, to the maximum value or the minimum value on the basis of the clip data signal CLPD, that is, the sign of the sign signal S. The above clipped value is continuously output to the data bus 106 during the second half of the second cycle Tc2. The clipped value for the upper data is stored in the register group 103 via the data bus 106.

Since the result of the operation on the first operand A and the second operand overflows, it is necessary to clip the result (AL+BL) of the operation on the lower data AL and BL transferred to the register group 103 in the first cycle Tc1. Hence, the data bus 106 is used to transfer the clipped value for the operation result (AL+BL) in the second half of the third cycle Tc3.

Hence, in the case where the operation on the first operand A and the second operand B is carried out with the precision twice as high as that of the ALU 100, the result of the above operation is continuously output to the bus 106 during three machine cycles after the first operand A and the second operand B are respectively output to the buses 104 and 105 if the result of the above operation overflows. That is, the above operation with the precision twice as high as that of the ALU 100 needs three machine cycles. In other words, if the precision of the operation of the ALU is reduced to half of the original precision in order to reduce the quantity of hardware thereof, execution of the above double-precision operation causes a delay of time equal to three times the machine cycle if the result of the operation overflows.

The present invention is intended to reduce the time necessary to execute the operation by an ALU with half the original precision and half the original quantity of hardware, while the above operation is carried out with a precision twice as high as that of the ALU.

Figure 3:
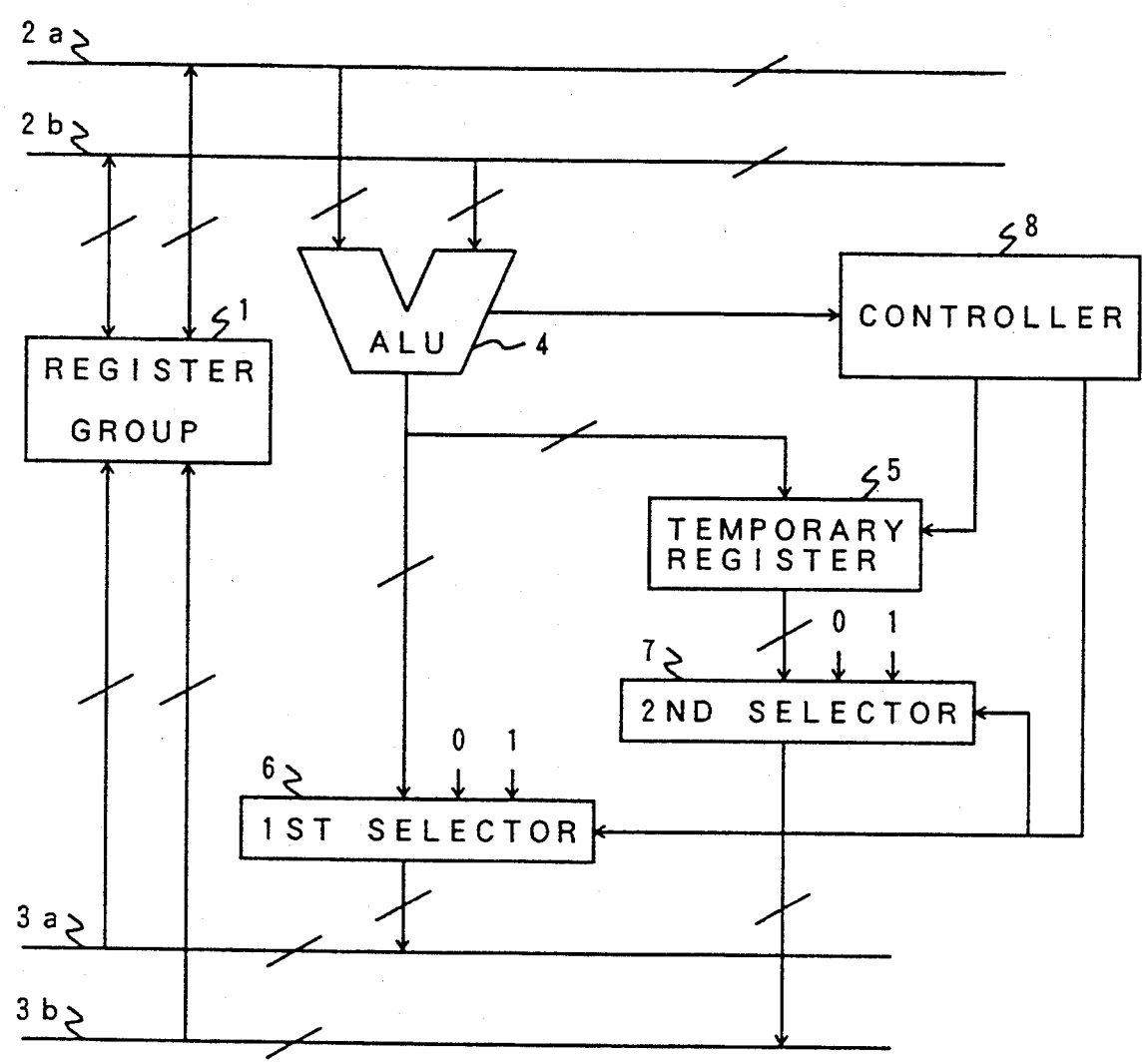
FIG. 3 is a block diagram of the principle of the present invention.

FIG. 3 is a block diagram of the principle of the present invention. A computing unit shown in FIG. 3 is made up of a group 1 of registers, a first bus 2a, a second bus 2b, a third bus 3a, a fourth bus 3b, an ALU 4, a temporary register 5, a first selector 6, a second selector 7, and a controller 8.

The first and second operands are read from the register group 1, which also stores the operation result. The first bus 2a and the second bus 2b are respectively used to transfer the first operand and the second operand output from the register group 1.

The ALU 4 performs an arithmetic operation on the first and second operands, and outputs the operation result. The temporary register 5 is used to temporarily store the operation result output by the ALU 4. The first selector 6 outputs the operation result without any modification, or outputs the clipped maximum value or the clipped minimum value. The second selector 7 outputs the output signal of the temporary register 5 without any modification, or outputs the clipped maximum value or the clipped minimum value. The third bus 3a and the fourth bus 3b are used to transfer the output signals of the first selector 6 and the second selector 7 to the register group 1.

The temporary register 5 stores the result of a double-precision operation on the lower data of the first operand and the lower data of the second operand in the first cycle. If the result of the operation on the upper data of the first operand and the upper data of the second operand in the second cycle does not overflow, the controller 8 causes the first selector 6 and the second selector 7 to output the operation result from the ALU 4 and the output signal of the temporary register 5 without any modification, respectively. Further, if the result of the operation on the upper data of the first operand and the upper data of the second operand overflows in the second cycle overflows, the controller 8 causes the first selector 6 and the second selector 7 to clip the operation result from the ALU 4 and the output signal of the temporary register 5, respectively. Hence, the clipped signals are output from the first selector 6 and the second selector 7.

Alternatively, the controller 8 causes the first selector 6 to output the operation result from the ALU 4 without any modification if the result of an operation with the same precision as that of the ALU 4 does not overflow. Further, the controller 8 causes the first selector 6 to clip the operation result of the ALU 4 if the result of the operation with the same precision as that of the ALU 4 overflows. Hence, the clipped signal is output from the first selector 6.

When the operation is carried out with the precision twice as high as that of the ALU 4 is carried out, the operation on the lower data of the first operand and the lower data of the second operand is carried out in the first cycle. The result of the above operation is stored in the temporary register 5. The operation on the upper data of the first operand and the upper data of the second operand is carried out in the second cycle.

If the result of the operation on the upper data executed in the second cycle does not overflow, the result of the operation on the upper data and the result of the operation on the lower data stored in the temporary register 5 are respectively output from the first selector 6 and the second selector 7 to the third bus 3a and the fourth bus 3b. Then, the result of the operation on the upper data and the result of the operation on the lower data are simultaneously output to the register group 1 via the third bus 3a and the fourth bus 3b.

If the result of the operation on the upper data executed in the second cycle overflows, the first selector 6 and the second selector 7 clip the result of the operation on the upper data and the result of the operation on the lower data stored in the temporary register 5 to the maximum value or the minimum value. Then, the clipped values for the upper and lower data are output to the third bus 3a and the fourth bus 3b, and are simultaneously stored in the register group 1 via the third bus 3a and the fourth bus 3b.

Hence, in the case where the operation is carried out with the precision twice as high as that of the ALU 4, the above operation can be carried out in the two consecutive machine cycles irrespective of whether or not the operation result overflows. That is, even if the precision of the ALU 4 is reduced to half the original precision in order to reduce the quantity of hardware thereof, the operation can be carried out at high speed by the above ALU 4 with the precision twice as high as that of the ALU 4, as compared with the structure shown in FIG. 1.

In the case where the operation is carried out with the precision twice as high as that of the ALU 4, the operation result is output without any modification via the first selector 6 if the operation result does not overflow. If the operation result overflows, the operation result is clipped by means of the first selector 8, and the clipped value is output.

A description will now be given of an embodiment of the present invention which is applied to a digital signal processor (DSP).

Figure 4:
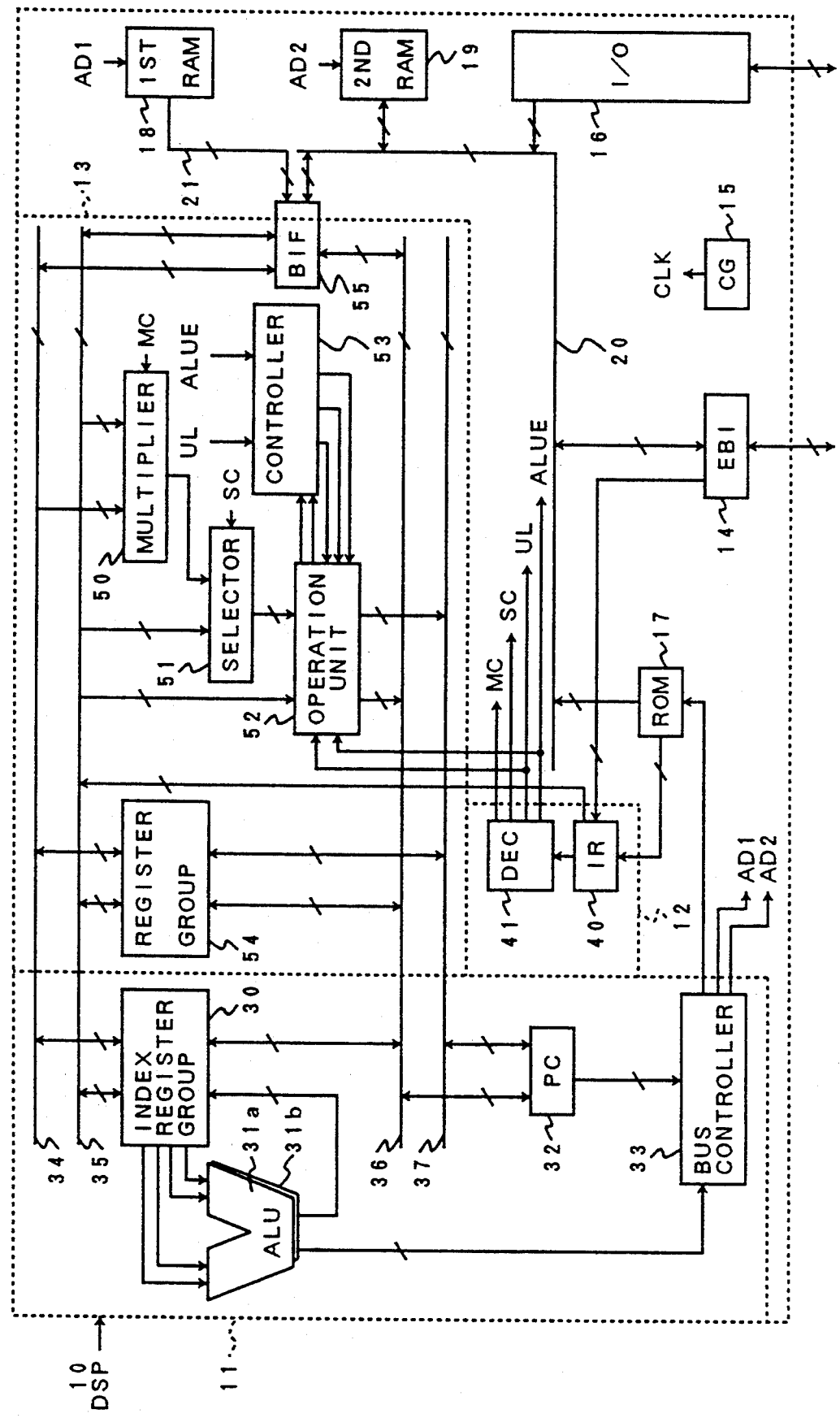
FIG. 4 is a block diagram of an embodiment of the present invention applied to a DSP.

Referring to FIG. 4, a DSP 10 is made up of an address calculation unit 11, a sequence unit 12, an execution unit 13, an external bus interface (EB1) 14, a clock generator (CG) 15, an input/output circuit 16, a ROM (Read Only Memory) 17, a first RAM (Random Access Memory) 18, a second RAM 19, and buses 20 and 21. The sequence unit 12 and the execution unit 13 form an ALU.

The command bus 20 mutually connects the sequence unit 12, the execution unit 13, the external bus interface 14, the input/output circuit 16, the ROM 17 and the second RAM 19.

As shown in FIGS. 9 and 10, the clock generator 15 operates a machine clock signal CLK which has a 50% duty ratio and periodically varies. The machine clock signal CLK is supplied to the structural parts of the DSP 10.

The address calculation unit 11 is made up of a group 30 of index registers, address calculators 31a and 31b, a program counter (PC) 32, and a bus controller 33.

The index register group 30 is connected to first through third buses 34 through 36, each of which buses consists of n bits (n is a natural number). Further, the index register group 30 is connected to the address calculator 31b. Address data used for address calculation is stored in the index register group 30.

The address calculator 31a performs address calculation on the basis of data received from the index register group 30, and outputs the calculation result to the bus controller 33. The address calculator 31b performs address calculation on the basis of data received from the index register group 30, and outputs the calculation result to the index register group 30.

The program counter 32 is connected to the third bus 36 and the fourth bus 37, and to the bus controller 33. The bus controller 33 accesses the ROM 17, the first RAM 18 or the second RAM 19 on the basis of the calculation result output by the address calculator 31a or the output signal of the program counter 32. The fourth bus 37 consists of n bits.

The sequence unit 12 is made up of a command register 40 and a command decoder 41. The command register 40 is connected to the external bus interface 14 and the ROM 17. The command register 40 holds the command code transferred from the external bus interface 14 or the ROM 17.

The command decoder 41 decodes the command code output from the command register 40 to a multiplier control signal MC, a selector control signal SC, an ALU control signal ALUE and an operation control signal UL. These signals are output to the execution unit 13.

The execution unit 13 is made up of a multiplier 50, a data selector 51, an operation circuit 52, a controller 53, a group 54 of registers, and bus interface (BIF) 55.

The multiplier 50 receives a first operand and a second operand via the first bus 34 and the second bus 35, respectively. The multiplier 50 multiplies the first operand by the second operand and outputs the product thereof if the multiplier control signal MC from the command decoder 41 is based on a multiplication command or a sum-of-products command. The operation result output by the multiplier 50 is output to the data selector 51.

The data selector 51 receives the output signal of the multiplier 50 and an adding number via the second bus 35. The data selector 51 selects either the output signal of the multiplier 50 or the adding number on the basis of the selector control signal SC, and outputs the selected signal to the operation circuit 52.

The operation circuit 52 receives, via the first bus 34, an added number to which the adding number is added. Further, the operation unit 52 receives the output signal from the data selector 51, that is, either the output signal of the multiplier 50 or the adding number transferred via the second bus 35. The operation circuit 52 adds the added number and the output signal of the data selector 51 on the basis of the ALU control signal ALUE and the operation control signal UL, and outputs the result of the operation based on the output control signals from the controller 53 to the third bus 36 or the fourth bus 37.

The operation result output by the operation circuit 52 is transferred to the register group 54 via the third bus 36 or the fourth bus 37. The first operand (multiplicand or added number) and the second operand (multiplier or adding number) are output from the register group 54 via the first bus 34 and the second bus 35.

Figure 5:
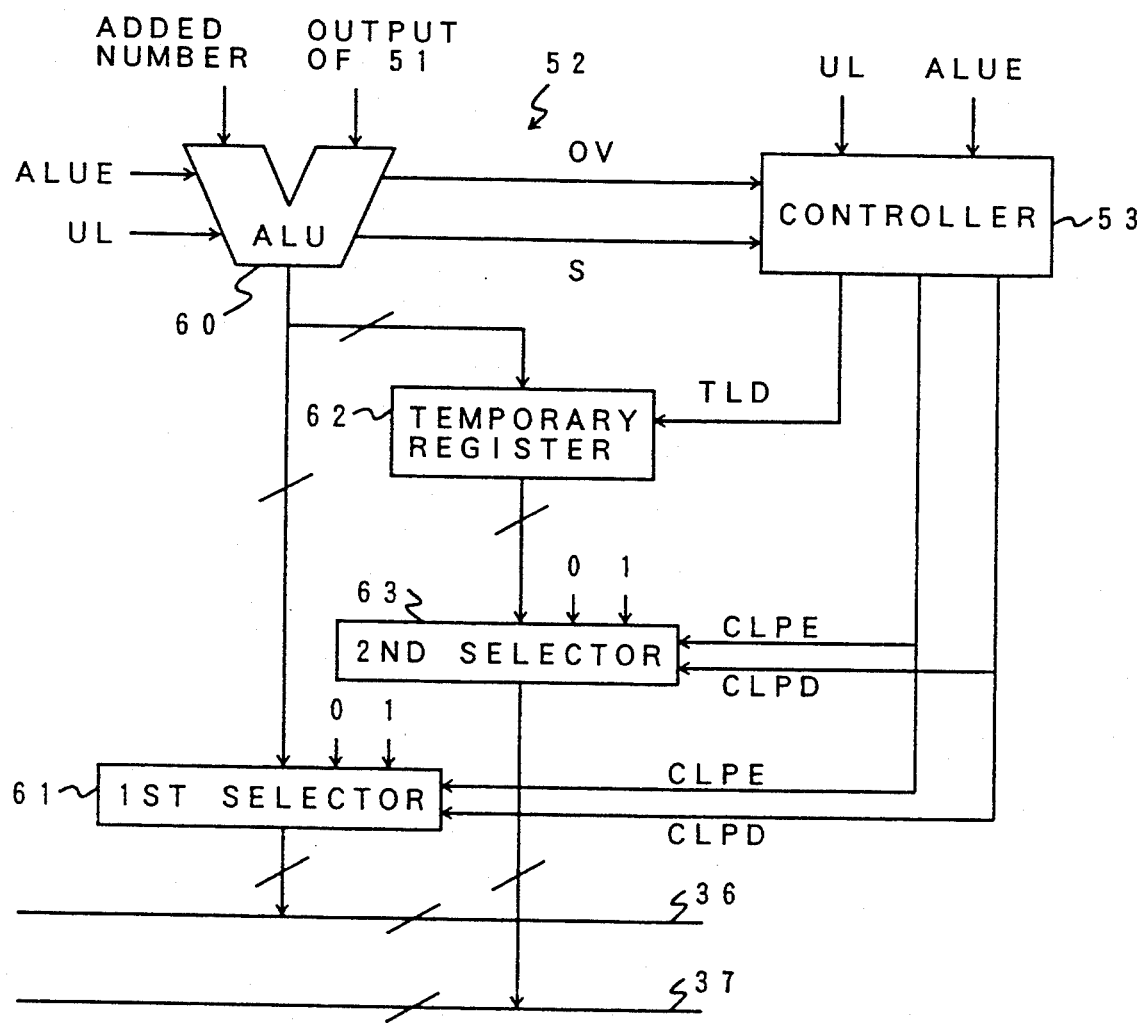
FIG. 5 is a logic circuit diagram of a computing unit used in the embodiment of the present invention.

FIG. 5 shows the operation circuit 52, which is made up of an ALU 60, a first selector 61, a temporary register 62 and a second selector 63.

The ALU 60 receives the added number of n bits via the data bus 52 and the n-bit output signal (adding number) from the data selector 51. The ALU 60 performs an adding operation on the added number and adding number, and the result of the operation is output to the first selector 61 and the temporary register 62.

The ALU 60 outputs the sign signal S indicating the sign of the most significant bit of the operation result to the controller 53 only when the ALU control signal ALUE indicates the logical value "1" and the operation control signal UL indicates the logical value "0". Further, the ALU 60 outputs the overflow signal OV indicating the logical value "1" to the controller 53 when the operation result overflows.

The temporary register 62 receives a latch signal TLD output from the controller 53. When the latch signal TLD indicates the logical value "1", the temporary register 62 latches the operation result of the ALU 60, the latched operation result being output to the second selector 63.

Figure 6:
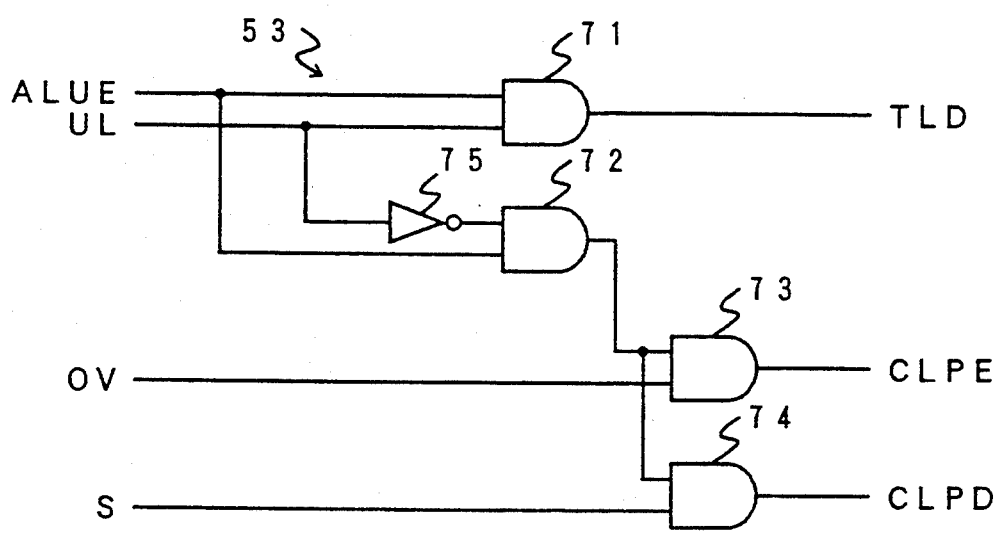
FIG. 6 is a logic circuit diagram of a controller used in the embodiment of the present invention.

As shown in FIG. 6, the controller 53 is made up of AND circuits 71 through 74, and a NOT circuit 75. The AND circuit 71 is supplied with the above-mentioned ALU control signal ALUE and the operation control signal UL. The AND circuit 71 outputs the latch signal indicative of the logical value "1" only when both the ALU control signal ALUE and the operation control signal UL indicate the logical values "1".

The AND circuit 72 receives the ALU control signal ALUE, and receives the operation control signal UL via the NOT circuit 75. The AND circuit 72 outputs the logical value "1" only when the ALU signal ALUE indicates the logical value "1" and the operation control signal UL indicates the logical value "0".

The AND circuit 73 receives the overflow signal OV and the output signal of the AND circuit 72, and outputs the clip enable signal CLPE based on the two received signals. Hence, the AND circuit 73 outputs the clip enable signal CLPE indicating the logical value "1" only when both the ALU control signal ALUE and the overflow signal OV indicate the logic value "1" and the operation control signal UL indicates the logical value "0".

The AND circuit 74 receives the above-mentioned sign signal S and the output signal of the AND circuit 72, and outputs the clip data signal CLPD based on the two received signals. Hence, the AND circuit 73 outputs the clip data signal CLPD indicating the logical value "1" only when both the ALU control signal ALUE and the sign signal S indicate the logical value "1" and the operation control signal UL indicates the logical value "0".

The first selector 61 receives the operation result from the ALU 60, and is connected to the third bus 36. The first selector 61 outputs, on the basis of the clip enable signal CLPE and the clip data signal CLPD, the operation result from the ALU 60 to the third bus 36 without any modification, or outputs the clipped maximum value or minimum value thereto.

Figure 7:
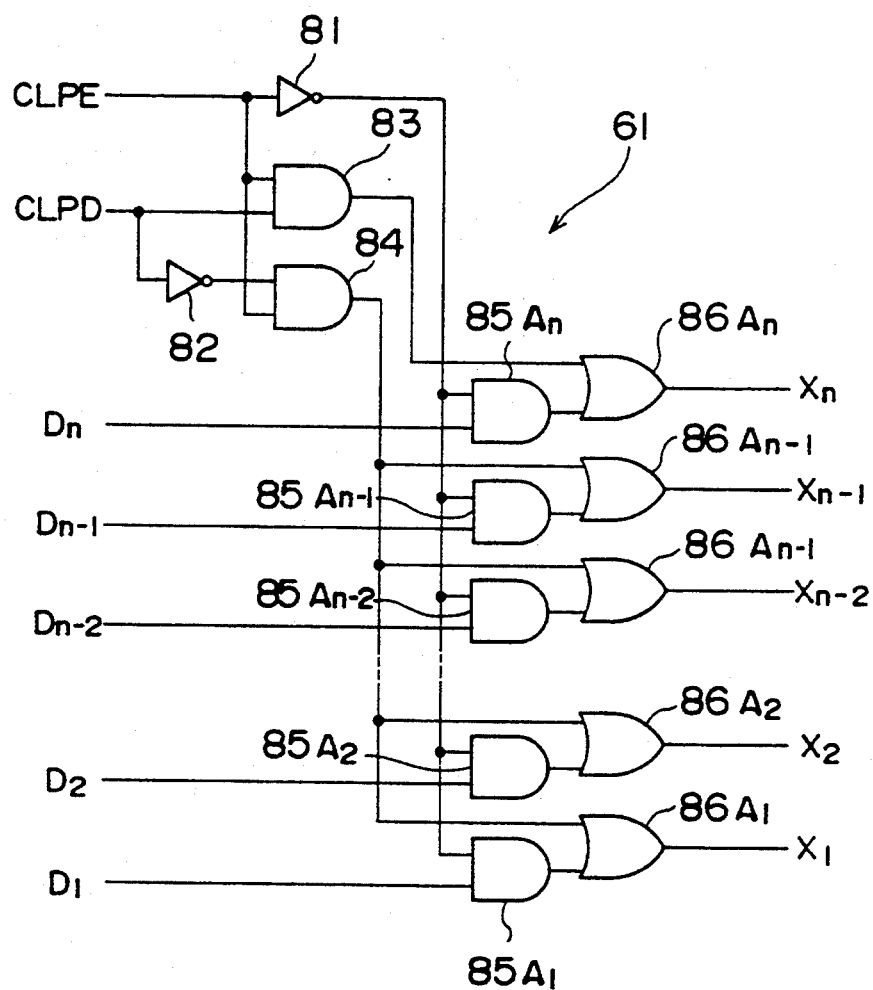
FIG. 7 is a logic circuit diagram of a first selector used in the embodiment of the present invention.

More particularly, as shown in FIG. 7, the first selector 61 is made up of NOT circuits 81 and 82, AND circuits 83, 84, 85A1 through 85An, and OR circuits 86A1 through 86An. The AND circuit 83 receives the above-mentioned clip enable signal CLPE and the clip data signal CLPD. The AND circuit 84 receives the clip enable signal CLPE and further receives the clip data signal CLPD via the NOT circuit 82. The n AND circuits 85A through 85An respectively receive bit signals D1 through Dn of the output signal of the ALU 60, and respectively receive the clip enable signal CLPE via the NOT circuit 81.

The OR circuits 86A1 through 86An−1 respectively receive the output signals of the AND circuits 85A1 through 85A−1 and the output signal of the above-mentioned AND circuit 84. Then, the OR circuits 86A1 through 86An−1 respectively output bit signals X1 through Xn−1 based on the received input signals. The OR circuit 86An receives the output signal of the AND circuit 85An and the output signal of the AND circuit 83. Then, the OR circuit 86An outputs a bit signal Xn based on the two received signals.

Hence, if the clip enable signal CLPE indicates "0", the output signal of the NOT circuit 81 becomes "1", and the output signals of the AND circuits 85A1 through 85An become the levels of the bit signals D1 through Dn. During this time, the output signals of the AND circuits 83 and 84 both indicate "0" irrespective of whether the level of the clip data signal CLPD is "0". As a result, the bit signals X1 through Xn of the OR circuits 86A1 through 86An become the output signals of the AND circuits 85A1 through 85An, that is, the bit signals D1 through Dn, respectively.

If the clip enable signal CLPE indicates "1" and the clip data signal CLPD indicates "0", the output signal of the NOT circuit 81 is switched to "0", and the output signals of the AND circuits 85A1 through 85An are all "0" irrespective of the levels of the bit signals D1 through Dn. During this time, the output signals of the AND circuits 83 and 84 are "0" and "1", respectively. As a result, only the bit signal Xn of the OR circuit 86An indicates "0", and the bit signals X1 through Xn−1 of the OR circuits 86A1 through 86An−1 indicate "1". Hence, the bit signals D1 through Dn are clipped to the maximum value.

Further, if the clip enable signal CLPE indicates "1" and the clip data signal CLPD indicates "1", the output signal of the NOT circuit 81 is switched to "0", and the output signals of the AND circuits 85A1 through 85An indicate "0" irrespective of the levels of the bit signals D1 though Dn. At this time, the output signals of the AND circuits 83 and 84 are "1" and "0", respectively. As a result, only the bit signal Xn of the OR circuit 86An indicates "1", and the bit signals X1 through Xn−1 of the OR circuits 86A1 through 86An−1 indicate "0". Hence, the bit signals D1 through Dn are clipped to the minimum value.

The second selector 63 receives the output signal of the temporary register 62, and is connected to the fourth bus 37. Then, the second selector 63 outputs, on the basis of the clip enable signal CLPE and the clip data signal CLPD, the output signal of the temporary register 62 to the fourth bus 37 without any modification or the clipped maximum value or minimum value thereto.

Figure 8:
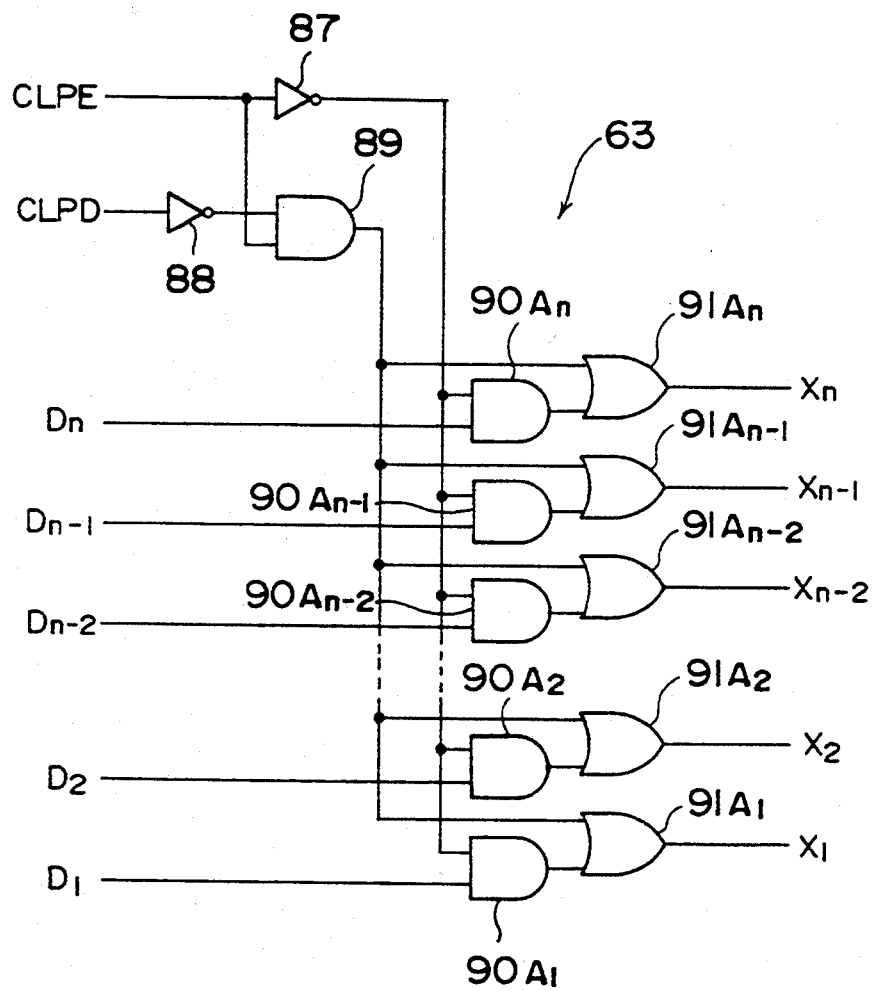
FIG. 8 is a logic circuit diagram of a second selector used in the embodiment of the present invention.

More particularly, as shown in FIG. 8, the second selector 63 is made up of NOT circuits 87 and 88, AND circuits 89, 90A1 through 90An, and OR circuits 91A1 through 91An. The AND circuit 89 receive the clip enable signal CLPE, and receives the clip data signal CLPD via the NOT circuit 88. The n AND circuits 90A1 through 90An receive the bit signals D1 through Dn read from the temporary register 62, and receives the clip enable signal CLPE via the NOT circuit 87.

The OR circuits 91A1 through 91An receive the output signals of the AND circuits 90A1 through 90An and the output signal of the AND circuit 89. Then, the OR circuits 91A1 through 91An output bit signals X1 through Xn based on the two received signals.

Hence, when the clip enable signal CLPE indicates "0", the output signal of the NOT circuit 87 indicates "1", and the output signals of the AND circuits 90A1 through 90An are switched to the levels of the bit signals D1 through Dn, respectively. During this time, the output signal of the AND circuit 89 indicates "0" irrespective of the level of the clip data signal CLPD. As a result, the bit signals X1 through Xn of the OR circuits 91A1 through 91An are output signals of the AND circuits 90A1 through 90An, that is, the bit signals D1 through Dn.

When the clip enable signal CLPE indicates "1" and the clip data signal CLPD indicates "0", the output signal of the NOT circuit 87 indicates "0", and the output signals of the AND circuits 90A1 through 90An indicate "0" irrespective of the levels of the bit signals D1 through Dn. During this time, the output signal of the AND circuit 89 indicates "1". As a result, the bit signals X1 through Xn of all the OR circuits 91A1 through 91An are clipped to "1".

Further, when the clip enable signal CLPE indicates "1" and the clip data signal CLPD indicates "1", the output signal of the NOT circuit 87 indicates "0", and the output signals of all the AND circuits 90A1 through 90An indicate "0" irrespective of the levels of the bit signals D1 through Dn. At this time, the output signal of the AND circuit 89 indicates "0". Hence, the bit signals of all the OR circuits 91A1 through 91An are clipped to "0".

A further description will now be given of an operation in which the above operation on the first operand A and the second operand B is carried out with a precision twice as high as that of the ALU 60.

FIG. 9 shows an operation in which the result of an operation on the first operand A of 2n bits and the second operand B of 2n bits does not overflow.

In the first cycle Tc1, the lower data AL of the first operand A and the lower data BL of the second operand are transferred to the ALU 60 via the buses 34 and 35, respectively. Further, the ALU control signal ALUE and the operation control signal UL indicates "1".

Then, the ALU 60 adds the lower data AL and the lower data BL, and continues to output the operation result (AL+BL) during a period equal to the sum of the second half of the first cycle Tc1 and the first half of the second cycle Tc2. During this time, the ALU control signal ALUE and the operation control signal UL both indicate "1", and hence the latch signal TLD output by the control signal 53 indicates "1", and the clip enable signal CLPE and the clip data signal CLPD both indicate "0".

Hence, the operation result (AL+BL) is latched in the temporary register 62 in the second half of the first cycle Tc1. The operation result (AL+BL) latched in the temporary register 62 is output to the second selector 63.

The upper data AU of the first operand A and the upper data BU of the second operand B are transferred, in the second cycle Tc2, to the ALU 60 via the first bus 34 and the second bus 35, respectively. Further, the ALU control signal ALUE indicates "1", and the operation control signal UL indicates "0".

The ALU 60 adds the upper data AU and the upper data BU, and continues to output the operation result (AU+BU) in the second half of the second cycle Tc2 and the first half of the third cycle Tc3. During this time, the ALU control signal ALUE indicates "1" and the operation control signal UL indicates "0", and therefore the latch signal TLD output by the controller 53 indicates "0". As a result, the operation result (AU+BU) is not latched in the temporary register 62.

If the operation result (AU+BU) does not overflow in the second cycle Tc2, the overflow signal OV indicates "0", and the clip enable signal CLPE indicates "0". Hence, in the second half of the second cycle Tc2, the operation result (AU+BU) is output from the selector 61 to the third bus 36 without any modification. Further, since the clip enable signal CLPE indicates "0", the operation result (AL+BL) latched in the temporary register 62 is output from the second selector 63 to the fourth bus 37 without any modification in the second half of the second cycle Tc2.

Then, the operation result (AU+BU) is stored in the register group 54 via the third bus 36, and the operation result (AL+BL) is stored in the register group 54 via the fourth bus 37.

Hence, in the case where the operation is carried out with the precision twice as high as that of the ALU 60, if the operation result does not overflow, the operation result with the precision twice as high as that of the ALU 60 is continuously output during a period equal to two cycles after the first operand A and the second operand B are output to the first bus 34 and the second bus 35, respectively.

FIG. 10 shows a case where the result of the operation on the first operand A consisting of 2n bits and the second operand B consisting of 2n bits.

In the first cycle Tc1, the result of the operation on the lower data AL and BL is continuously output during a period equal to the sum of the second half of the first cycle Tc1 and the first cycle of the second cycle Tc2 in the same manner as in the case shown in FIG. 9. Since the ALU control signal ALUE and the operation control signal both indicate "1", the latch signal TLD indicates "1", and the operation result (AL+BL) is latched in the temporary register 62 in the second half of the first cycle Tc1.

In the second cycle Tc2, the upper data AU of the first operand A and the upper data BU of the second operand B are output to the ALU 60 via the first bus 34 and the second bus 35, respectively. Further, the ALU control signal ALUE indicates "1", and the operation control signal UL indicates "0".

The ALU 60 adds the upper data AU and the upper data BU, and continues to output the operation result (AU+BU) during a period equal to the sum of the second half of the second cycle Tc2 and the first half of the third cycle Tc3. During this time, the ALU control signal ALUE indicates "1" and the operation control signal UL indicates "0". Hence, the latch signal TLD output by the controller 53 indicates "0". Hence, the operation result (AU+BU) is not latched in the temporary register 62.

If the operation result (AU+BU) overflows in the second half of the second cycle Tc2, the overflow single OV indicates "1", and the clip enable signal CLPE indicates "1". Further, the sign signal S of the ALU 60 is output as the clip data signal CLPD.

Hence, the clipped value obtained by clipping the operation result (AU+BU) on the basis of the value of the sign signal S is output from the first selector 61 to the third bus 36 during the second half of the second cycle Tc2. Further, during the second half of the second cycle Tc2, the clipped value obtained by clipping the operation result (AL+BL) on the basis of the value of the sign signal S is output from the second selector 63 to the fourth bus 37.

The clipped value for the result of the operation on the upper data is registered in the register group 54 via the third bus 36, and the clipped value for the result of the operation on the lower data is registered in the register group 54 via the fourth bus 37.

Hence, in the case where the operation on the first operand A and the second operand B is carried out with the precision twice as high as that of the ALU 60, the double-precision operation result is continuously output to the third bus 36 and the fourth bus 37 during a period equal to two machine cycles after the first operand A and the second operand B are output to the first bus 34 and the second bus 35, respectively, even if the operation result overflows.

In the above computing unit, in a case where an adding operation on the first operand A of n bits and the second operand B of n bits is carried out with the same precision as that of the ALU 60, the first operand A and the second operand B are transferred to the ALU 60 via the buses 34 and 35 in the first cycle Tc1. Further, the ALU control signal ALUE switches to "1" and the operation control signal UL switches to "1" and the operation control signal UL switches to "0".

The ALU 60 adds the first operand A and the second operand B, and continues to output the operation result (A+B) to the first selector 61 and the temporary register 62 during a period equal to the sum of the second half of the first cycle Tc1 and the first half of the second cycle Tc2. During this period, the ALU control signal ALUE indicates "1" and the operation control signal UL indicates "0". Hence, the latch signal TLD from the controller 53 indicates "0", and the operation result (A+B) is not latched in the temporary register 62.

If the operation result (A+B) does not overflow in the first cycle Tc1, the overflow signal OV indicates "0", and the clip enable signal CLPE indicates "0". Hence, the operation result (A+B) is output from the first selector 61 to the third bus 36 without any modification. Then, the operation result (A+B) is stored in the register group 54 via the third bus 36.

If the operation result (A+B) overflows in the first cycle Tc1, the overflow signal OV indicates "1", and the clip enable signal CLPE indicates "1". Further, the sign signal S from the ALU 60 is output as the clip data signal CLPD. Hence, in the second half of the first cycle Tc1, the clipped value obtained by clipping the operation result (A+B) on the basis of the value of the sign signal S is output from the first selector 61 to the third bus 36. Hence, the clipped value is stored in the register group 54 via the third bus 36.

In-short, in the case where the operation on the first operand A and the second operand B is carried out with the same precision as that of the ALU 60, the operation result is continuously output to the third bus 36 and the fourth bus 37 during a period equal to a machine cycle after the first operand A and the second operand B are output to the first bus 34 and the second bus 35 irrespective of whether or not the operation result overflows.

As described above, in the case where the operation is carried out with the precision twice as high as that of the ALU 60 of the computing unit in the DSP 10 according to the embodiment of the present invention being considered, the above double-precision operation can be carried out in two machine cycles. That is, it is possible to carry out the double-precision operation by using a low-precision ALU with a precision half of the precision of a high-precision ALU capable of carrying out the double-precision operation in a single machine cycle. Use of such a low-precision ALU contributes to reduction in the quantity of hardware thereof and speedup of the operation. It is possible to set the machine cycle of the low-precision ALU to be shorter than that of the high-precision ALU.

Hence, it is possible to reduce the quantity of hardware of the ALU to half of the original and to prevent a reduction in the operating speed. Further, it is possible to reduce the quantity of hardware of the DSP by using the low-precision ALU and to hence improve the yield rate. This reduces the cost of the DSP.

It is expected that with the speedup of the DSPs the ratio of the non-high-precision operation (having a precision equal to that of the ALU) for the peripheral circuit control will increase in the applications of the DSPs to the control systems. When the ALU 60 of the computing unit in the DSP 10 according to the embodiment being considered performs an single-precision (low-precision) operation on two operands each consisting of n bits and a twice-precise (high-precision) operation on two operands each consisting of 2n bits, it takes two machine cycles to execute the sum-of-products operation with the twice precision by means of the ALU 60. It will now be assumed that the ratio of the double-precision operations in processing for a control system is approximately 50% and setting of the operating precision of the ALU to be half leads to an approximately 40% reduction in the machine cycle of the DSP.

The operation processing time of the control system which uses the computing unit of the DSP 10 according to the embodiment of the present invention being considered can be reduced as follows:

$$\left\{ \frac{(N/2)}{\underset{(1)}{\downarrow}} \times \frac{2}{\underset{(2)}{\downarrow}} + \frac{(N/2)}{\underset{(3)}{\downarrow}} \right\} \times \frac{0.6}{\underset{(4)}{\downarrow}} = 0.9 \times N$$

where:
N: control system processing time of DSP with the double-precision ALU
(1): highly-precise operation
(2): number of machine cycles
(3): single-precision operation
(4): reduced-to-original machine cycle ratio.

Taking into account the future trend in which the proportion of the single-precision operations increases in the processing of the DSP in a control system due to speedup of the DSP, the DSP with the low-precision ALU is advantageous to the DSP with the high-precision ALU in terms of the processing speed and the production cost because of reduction in the quantity of hardware.

The present invention is not limited to the specifically disclosed embodiments, and variations and modifications may be made without departing from the scope of the present invention.

What is claimed is:

1. A computing unit, comprising:
register means for storing first and second operands and results of operations;
first and second buses for transferring the first and second operands output from the register means;
an ALU for performing an operation on the first and second operands and for outputting a result of the operation;
a temporary register for temporarily storing the result of the operation output by said ALU;
first selector means for selecting either the result of the operation output by said ALU or a first clipped value;
second selector means for selecting either an output signal of said temporary register or a second clipped value;
third and fourth buses for transferring output signals of said first and second selector means to said register means; and
control means receiving overflow data from said ALU, for determining whether or not said result output by said ALU indicates an overflow as a result of said operation by said ALU, and for controlling said first and second selector means on a basis of whether or not the result of the operation output by said ALU overflows;
wherein said ALU operates on n bits in a single machine cycle where n is a natural number; and
each of said first and second operands comprises 2n bits; and
wherein said control means comprises:
first means for causing a result of an operation on lower data of the first operand and lower data of the second operand obtained in a first cycle of said ALU to be stored in said temporary register;
second means for causing, when a result of an operation on upper data of the first operand and upper data of the second Operand performed in a second cycle of said ALU does not overflow, said first and second selector means to output the result of said operation on the upper data output by said ALU and an output signal of the temporary register; and
third means for causing, when the result of the operation on the upper data overflows, said first and second selector means to output the first and second clipped values.

2. The computing unit as claimed in claim 1, wherein:
said first clipped value is either a maximum or minimum value of the first and second operands; and
said second clipped value is either the maximum or minimum value of the first and second operands.

3. A computing unit, comprising:
register means for storing first and second operands and results of operations;
first and second buses for transferring the first and second operands output from the register means;

an ALU for performing an operation on the first and second operands and for outputting a result of the operation;

a temporary register for temporarily storing the result of the operation output by said ALU;

first selector means for selecting either the result of the operation output by said ALU or a first clipped value;

second selector means for selecting either an output signal of said temporary register or a second clipped value;

third and fourth buses for transferring output signals of said first and second selector means to said register means; and control means receiving overflow data from said ALU, for determining whether or not said result output by said ALU indicates an overflow as a result of said operation by said ALU, and for controlling said first and second selector means on a basis of whether or not the result of the operation output by said ALU overflows;

wherein said ALU operates on n bits in a single machine cycle where n is a natural number; and each of said first and second operands comprises n bits; and wherein said control means comprises:
first means for causing the result of the operation of on the first operand and the second operand to be stored in said temporary register when said result of the operation does not overflow; and
second means for causing said first and second selector means to output the first and second clipped values when said result of the operation overflows.

4. A digital signal processor, comprising:
a computing unit; and
an interface unit for establishing an interface between said computing unit and an external device,
said computing unit comprising:
register means for storing first and second operands and results of operations;
first and second buses for transferring the first and second operands output from the register means;
an ALU for performing an operation on the first and second operands and for outputting a result of the operation;
a temporary register for temporarily storing the result of the operation output by said ALU;
first selector means for selecting either the result of the operation output by said ALU or a first clipped value;
second selector means for selecting either an output signal of said temporary register or a second clipped value;
third and fourth buses for transferring output signals of said first and second selector means to said register means; and
control means receiving overflow data from said ALU, for determining whether or not said result output by said ALU indicates an overflow as a result of said operation by said ALU, and for controlling said first and second selector means on a basis of whether or not the result of the operation output by said ALU overflows;
wherein said ALU operates on n bits in a single machine cycle where n is a natural number; and
each of said first and second operands comprises 2n bits; and
wherein said control means comprises:
first means for causing a result of an operation on lower data of the first operand and lower data of the second operand obtained in a first cycle of said ALU to be stored in said temporary register;
second means for causing, when a result of an operation on upper data of the first operand and upper data of the second operand performed in a second cycle of said ALU does not overflow, said first and second selector means to output the result of said operation on the upper data output by said ALU and an output signal of the temporary register; and
third means for causing, when the result of the operation on the upper data overflows, said first and second selector means to output the first and second clipped values.

5. The digital signal processor as claimed in claim 4, wherein:
said first clipped value is either a maximum or minimum value of the first and second operands; and
said second clipped value is either the maximum or minimum value of the first and second operands.

6. A digital signal processor, comprising:
a computing unit; and
an interface unit for establishing an interface between said computing unit and an external device,
said computing unit comprising:
register means for storing first and second operands and results of operations;
first and second buses for transferring the first and second operands output from the register means;
an ALU for performing an operation on the first and second operands and for outputting a result of the operation;
a temporary register for temporarily storing the result of the operation output by said ALU;
first selector means for selecting either the result of the operation output by said ALU or a first clipped value;
second selector means for selecting either an output signal of said temporary register or a second clipped value;
third and fourth buses for transferring output signals of said first and second selector means to said register means; and
control means receiving overflow data from said ALU, for determining whether or not said result output by said ALU indicates an overflow as a result of said operation by said ALU, and for controlling said first and second selector means on a basis of whether or not the result of the operation output by said ALU overflows;
wherein said ALU operates on n bits in a single machine cycle where n is a natural number; and
each of said first and second operands comprises n bits; and
wherein said control means comprises:
first means for causing the result of the operation of on the first operand and the second operand to be stored in said temporary register when said result of the operation does not overflow; and
second means for causing said first and second selector means to output the first and second clipped values when said result of the operation overflows.

* * * * *